UNITED STATES PATENT OFFICE.

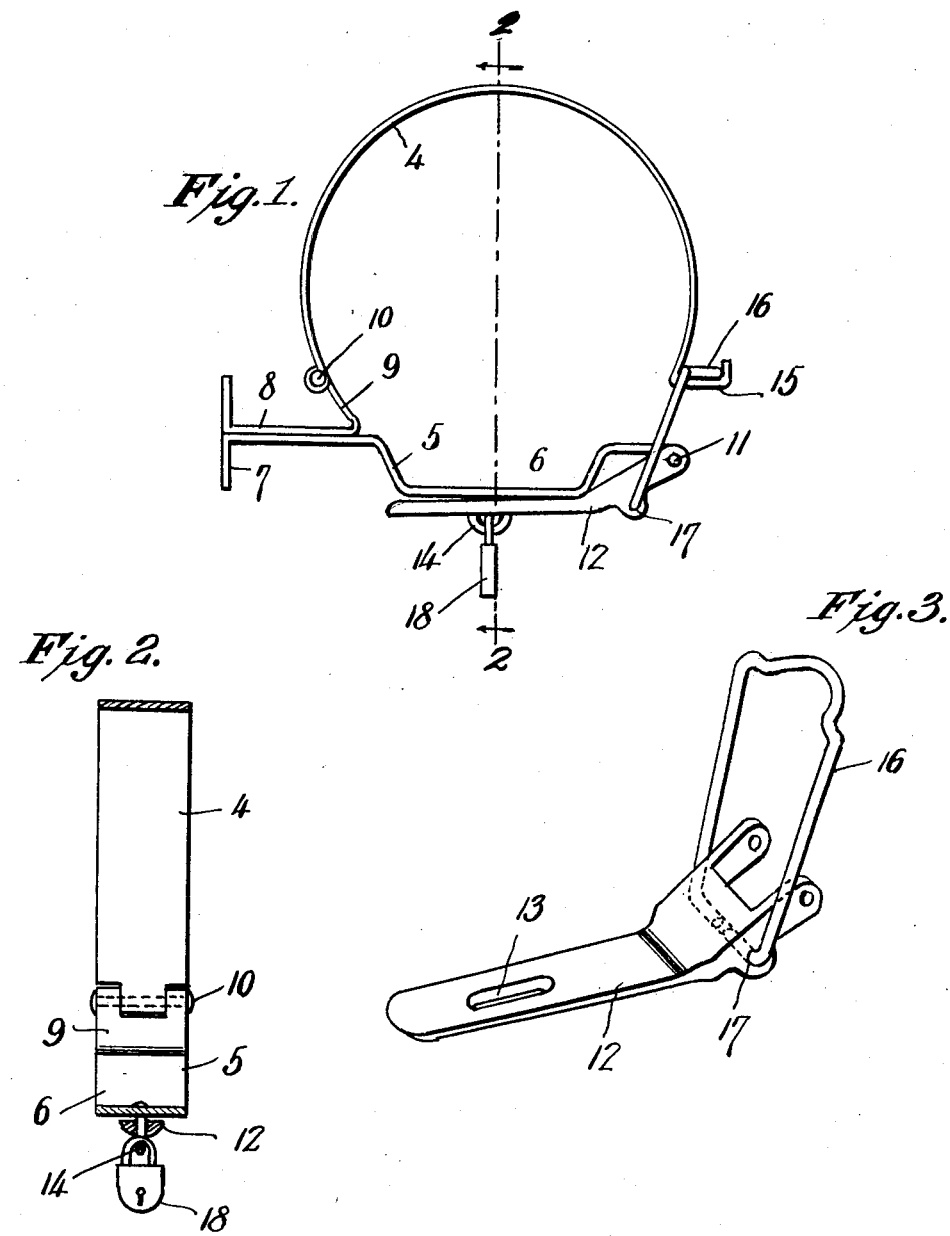

LOUIS A. GRAMS, OF RANDOLPH, SOUTH DAKOTA.

TIRE-HOLDER.

1,386,401.  Specification of Letters Patent.  Patented Aug. 2, 1921.

Application filed August 5, 1918. Serial No. 248,366.

*To all whom it may concern:*

Be it known that I, LOUIS A. GRAMS, a citizen of the United States, residing at Randolph, in the county of Brown and State of South Dakota, have invented certain new and useful Improvements in Tire-Holders, of which the following is a specification.

This invention relates to tire holders for supporting extra casings upon motor vehicles, and has for its primary object to generally simplify and improve the construction and operation of such devices as well as to increase their efficiency.

A further object of the invention is to provide a tire holder which shall be of extremely simple and inexpensive construction and which may be readily attached to a vehicle body, and which is constructed in such manner that extra tires may be quickly and easily applied to and removed therefrom.

A further object of the invention is to provide a tire holder of the character stated which is equipped with the means for preventing the unauthorized removal of the tires, and which securely clamps the tire in proper position upon the rear of the vehicle without danger of the same becoming loose or detached.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1, is a side elevation of the tire holder.

Fig. 2, is a vertical sectional view taken upon line 2—2 of Fig. 1, and

Fig. 3, is an enlarged detail perspective view illustrating the improved clamping lever and its associated part.

The holder in the present instance comprises a pair of connected sections 4 and 5, between which the tire is to be confined. These sections are preferably formed of spring steel so as to be strong and durable in use and yet be able to adapt themselves to the configuration and size of the tire.

The section 5 is the base section of the holder, and is adapted to receive and support the bead portions of the tire. It will be observed that this base section provides a recess indicated generally at 6, within which the bead portions of the tire rest, while one end of this section is extended outwardly and forms a foot 7 by means of which the same may be secured to a vehicle body. A foot section 8 is attached to the base 5 and also provides a foot portion, and these elements may be secured together in any approved manner. The foot section 8 at its inner end is extended upwardly and rearwardly as at 9, and supports a pin 10 to which one end of section 4 is hingedly connected.

The end of the base section 5 remote from the foot 7 has pivoted thereto as at 11 a locking lever 12. This lever is designed to swing beneath the section 5 and to lie snugly against the under face of the depressed or bottom portion 6 of the base section, and is provided near its free end with an elongated aperture 13 to receive a loop 14 depending from the under side of the base section 5.

The free end of the upper section 4 is turned outwardly and provides a lip 15, within which is adapted to engage the free end of a loop or link 16. This link is connected to the lever 12 as at 17 inwardly from the pivot 11.

It will be observed that when the free end of link 16 is resting in the lip 15 and the lever 12 has been swung upwardly to its limit, the pivot 17 will have passed inwardly beyond a straight line between pivot 11 and the point of connection of link 16 with the section 4, whereupon an eccentric lock is provided. As has been before stated, the material of which section 4 is constructed is spring metal and the tendency for this metal is to straighten. This pressure therefore holds the clamping lever 12 securely locked. When it is desired to prevent unauthorized persons from removing a tire from the holder a padlock 18 may have its shank passed through the loop 14.

The portion 14 is of such shape as to enable the same to fit upon the tread and sides of the tire, and when the lever 12 is moved upwardly into closed position the said section will be tightly bound upon the tread and side portions of the tire. The holder may be adapted to various sizes of tires, and it will be understood that when the lever 12 is moved downwardly until the eccentric lock before mentioned is broken, the free end of link 16 may be readily removed from engagement with lip 15, whereupon section 4 may be swung upwardly into such position as will enable the tire to be removed from the holder. The holder may be secured to the body of the vehicle by passing screws or bolts through the foot portions 7 and 8.

While the present is a disclosure of the preferred embodiment of the invention, it is to be understood that the invention is not limited thereto, as various changes in the minor details of construction, proportion, and arrangement of parts may be resorted to if desired without departing from the spirit of the invention as defined by the appended claim.

Having thus described my invention, what I claim as new and desire to secure by Letters Patent is:—

A tire holder comprising a base section having horizontally extending alined ends and a depression between the horizontal ends, a plate secured to one of the horizontal ends and provided with an upwardly extending flange, a flexible strip hingedly connected to the upwardly extending flange and having its free end bent to form a channeled flange, a lever pivotally connected to the horizontal end opposite to the one having the plate secured thereto, and a link pivotally connected to the lever, the free end of said link adapted to be received in the channeled flange of the flexible strip.

In testimony whereof I affix my signature in presence of two witnesses.

LOUIS A. GRAMS.

Witnesses:
ROBERT F. WESTERHOFF,
WM. R. DUNNEBECKE.